(12) United States Patent
Lin et al.

(10) Patent No.: US 11,315,530 B2
(45) Date of Patent: Apr. 26, 2022

(54) TRACKING SYSTEM AND RELATED POSITIONING AND CALIBRATION METHODS

(71) Applicant: ACER INCORPORATED, New Taipei (TW)

(72) Inventors: Jia-Yu Lin, New Taipei (TW); Chih-Chiang Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 393 days.

(21) Appl. No.: 16/556,216

(22) Filed: Aug. 29, 2019

(65) Prior Publication Data
US 2020/0168181 A1    May 28, 2020

(30) Foreign Application Priority Data
Nov. 28, 2018    (TW) .................................. 107142411

(51) Int. Cl.
*G09G 5/38*       (2006.01)
*G02B 26/10*    (2006.01)

(52) U.S. Cl.
CPC .............. *G09G 5/38* (2013.01); *G02B 26/101* (2013.01); *G02B 26/108* (2013.01); *G09G 2320/0693* (2013.01); *G09G 2340/0464* (2013.01); *G09G 2354/00* (2013.01)

(58) Field of Classification Search
CPC ....... G09G 5/38; G02B 26/101; G02B 26/108
See application file for complete search history.

(56) References Cited

U.S. PATENT DOCUMENTS

| 7,016,048 B2 | 3/2006 | Chen |
| 8,517,921 B2 | 8/2013 | Tremaglio |
| 10,482,677 B1* | 11/2019 | Iyer ...................... G06K 9/3241 |
| 11,056,037 B1* | 7/2021 | Buckley .............. G09G 3/3426 |

(Continued)

FOREIGN PATENT DOCUMENTS

| CN | 105044672 A | 11/2015 |
| CN | 107106907 A | 8/2017 |

(Continued)

OTHER PUBLICATIONS

Milanović, Veljko, et al. "A fast single-pixel laser imager for VR/AR headset tracking." MOEMS and Miniaturized Systems XVI. vol. 10116. International Society for Optics and Photonics, 2017. (pp. 1-10).*

*Primary Examiner* — Sarah Lhymn
(74) *Attorney, Agent, or Firm* — Winston Hsu (57) ABSTRACT

A tracking system for positioning a user's location comprise a scan device including a light scanning module for generating a scan light source, where the light scanning module includes a point light source, a prism, a reflector and a synchronization processing module, the prism rotates with a rotation speed, the synchronization processing module is used to control the reflector to rotate with an angle according to the rotation speed, so that the light emitted to the prism is reflected to a specific direction to form the scan light source, a head mounted displayer, which includes a plurality of receivers for detecting the scan light source, for generating information about the scan light source, and an computing device for calculating the location of the user based on the information.

17 Claims, 11 Drawing Sheets

(56) References Cited

U.S. PATENT DOCUMENTS

| | | | |
|---|---|---|---|
| 2014/0118808 A1* | 5/2014 | Park | G02B 26/127 |
| | | | 359/197.1 |
| 2015/0049004 A1* | 2/2015 | Deering | G02B 27/0093 |
| | | | 345/8 |
| 2016/0116740 A1* | 4/2016 | Takahashi | G06F 21/32 |
| | | | 345/8 |
| 2016/0131761 A1 | 5/2016 | Yates | |
| 2016/0187974 A1 | 6/2016 | Mallinson | |
| 2016/0260251 A1* | 9/2016 | Stafford | G02B 27/0101 |
| 2016/0262608 A1 | 9/2016 | Krueger | |
| 2017/0160541 A1* | 6/2017 | Carothers | G02B 5/04 |
| 2017/0214907 A1* | 7/2017 | Lapstun | G09G 3/02 |
| 2017/0359883 A1 | 12/2017 | Ansari | |
| 2019/0107623 A1* | 4/2019 | Campbell | G01S 17/931 |

FOREIGN PATENT DOCUMENTS

| | | |
|---|---|---|
| CN | 107683420 A | 2/2018 |
| CN | 108762488 A | 11/2018 |
| TW | I559034 B | 11/2016 |

\* cited by examiner

TRACKING SYSTEM AND RELATED POSITIONING AND CALIBRATION METHODS

BACKGROUND OF THE INVENTION

1. Field of the Invention

The present invention relates to a tracking device, and more particularly, to a tracking device for 360 degree tracking and positioning in a virtual reality system.

2. Description of the Prior Art

Most virtual reality (VR) system can track user's movement with 3D tracking system to increase user's willingness of VR immersion. However, the widely used VR tracking system on the market, either applied with signal emitting source or phase space algorithm-based signal receiver, requires equipment installation in the wall, such as a light house and PhaseSpace camera. Besides, this equipment requires additional power supply. In addition, the installation angle and height for the lighthouse or PhaseSpace camera need to be calculated to cover a sufficient range for tracking user's movements/actions. Therefore, it is difficult to promote the light house and PhaseSpace camera to be used in a home space due to installation problems.

Moreover, the abovementioned optical positioning technologies are in practice to set a light source and a light receiver respectively on a fixed point and a head-mounted display (HMD). The difference is that the PhaseSpace proposes that the light source is deployed at the head mounted displayer (HMD) for positioning, and the PhaseSpace camera is set up as the light receiver. On the other hand, the lighthouse is used as the scanning light source for positioning and the light receiver is placed on the HMD. In addition, Lenovo launched the Augmented Reality (AR) product suite, which uses a tracking beacon placed on the ground to allow the tracking system to serve as a reference point for virtual image projection. Thus, the virtual character can be projected in the proper position.

SUMMARY OF THE INVENTION

It is therefore an objective to provide a simple set up tracking system and related positioning and calibration methods to solve the above problem.

The present invention discloses a tracking system for positioning a user's location. The tracking system comprises a scan device, comprising a first light scanning module, for generating a first scan light source, where the first light scanning module rotates in clockwise, in counterclockwise, or with fixed angle swing with respect to the scan device, and the first scanning light source is a symmetrical light, a head mounted displayer, comprising a plurality of receivers, for detecting the first scan light source, to generate information about the first scan light source, and a computing device, for calculating the location of the user based on the information.

The present invention discloses a scan device for a tracking system. The scan device comprises a first light scanning module, for generating a first scan light source, wherein the first light scanning module rotates in clockwise, in counterclockwise, or with fixed angle swing with respect to the scan device, and the first scanning light source is a symmetrical light.

The present invention discloses a respectively for a tracking system. The head mounted displayer comprises a light receiving module, disposed at a side and a rear of the head mounted displayer, wherein the light receiving module comprises a plurality of receivers for detecting a scanning light source generated by a scan device of the tracking system, and a fixed strap, for providing a user of wearing the head mounted displayer.

The present invention discloses a computing device for a tracking system comprising a scan device and a head mounted displayer. The computing device comprises a processing unit, for executing a program code, and a storage unit, coupled to the processing unit, for storing the program code, wherein the program code instructs the processing unit to perform the following steps: receiving a first information about an angular velocity of the scan device, receiving a second information about a scanning light source of the scan device detected by the head mounted displayer, wherein the second information comprising a time of the scanning light source detected by a plurality of receivers of the head mounted displayer, calculating time differences of the scanning light source detected by the plurality of receivers, and calculating a location of a user according to the time differences, the angular velocity, and a set distance between the plurality of receivers.

The present invention discloses a positioning method for a computing device of a tracking system. The method comprises receiving a first information about an angular velocity of a scan device of the tracking system, receiving a second information about a scanning light source of the scan device detected by the head mounted displayer, wherein the second information comprising a time of the scanning light source detected by a plurality of receivers of the head mounted displayer, calculating time differences of the scanning light source detected by the plurality of receivers, and calculating a location of a user according to the time differences, the angular velocity, and a set distance between the plurality of receivers.

The present invention discloses a method of calibrating image displaying for a tracking system comprising a scan device, a computing device and a head mounted displayer. The method comprises via the head mounted displayer, displaying an image including a calibration frame of a fixed position, via the computing device, transmitting an image data to the head mounted displayer, wherein the image data includes a reference point of a first angle or a first distance, calculating a relative angle or a relative distance between the head mounted displayer and the scan device when the head mounted displayer moves to move the calibration frame to the reference point of the first angle or the first distance, and connecting the relative angle or the relative distance with the first angle or the first distance for use as an angle reference or a distance reference for image displaying.

The present invention discloses a computing device of a tracking system comprising a scan device and a head mounted displayer, for calibrating image displaying of a virtual reality. the computing device comprises a processing unit, for executing a program code, and a storage unit, coupled to the processing unit, for storing the program code, wherein the program code instructs the processing unit to perform the following steps: transmitting a first image data to the head mounted displayer, wherein the first image data includes a calibration frame of a fixed position, transmitting a second image data to the head mounted displayer, wherein the second image data includes the calibration frame and a reference point of a first angle or a first distance, calculating a relative angle or a relative distance between the head mounted displayer and the scan device when the head mounted displayer moves to move the calibration frame to the reference point of the first angle or the first distance, and connecting the relative angle or the relative distance with the first angle or the first distance for use as an angle reference or a distance reference for image displaying.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
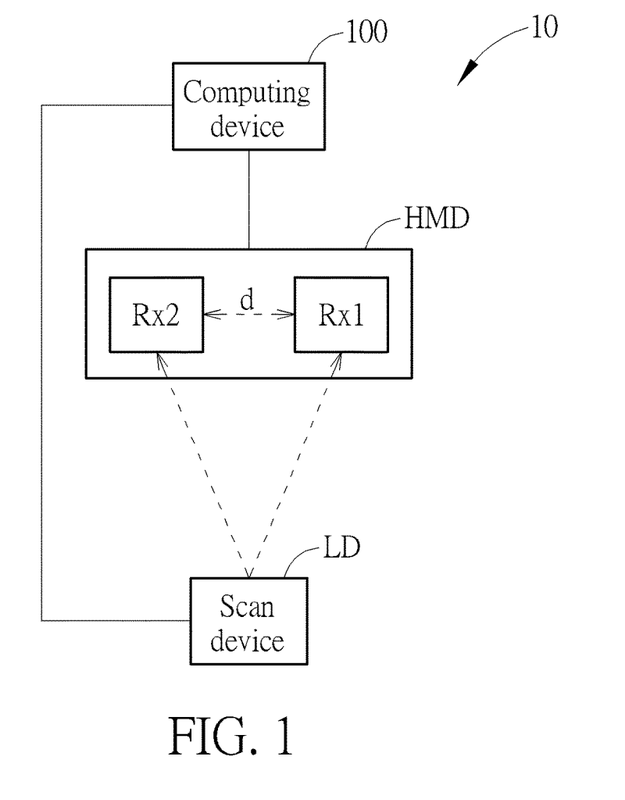
FIG. 1 is a schematic diagram of a tracking system according to an embodiment of the present disclosure.

Reference is made to FIG. 1, which is a schematic diagram of the tracking system 10 according to an embodiment of the present disclosure. The tracking system 10 includes the scan device LD, the head mounted displayer (HMD) and the computing device 100. The scan device LD is used for generating scanning light source, such as infrared light. The HMD is used for detecting the scanning light source generated by the scan device LD, so as to generate information about the scanning light source and transmit the information to the computing device 100. The computing device 100 is connected to the scan device LD and HMD with wire or wireless communication manner, and can calculates a location of the user wearing the HMD based on the information.

Figure 2:
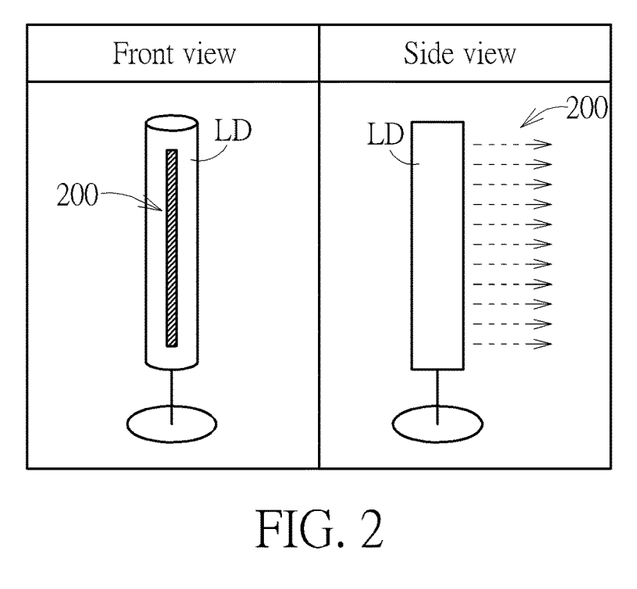
FIG. 2 is a schematic diagram of an appearance of a scan device according to an embodiment of the present disclosure.
Figure 3:
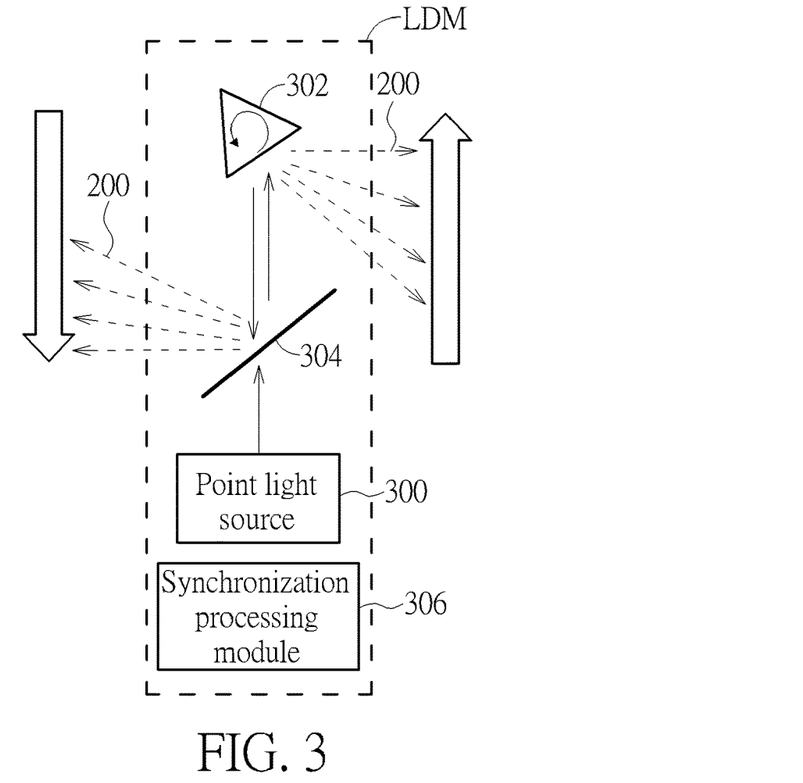
FIG. 3 is a schematic diagram of a structure of a scan device according to an embodiment of the present disclosure.

Refer to FIGS. 2-3 for detailed description of the scan device LD. FIG. 2 is a schematic diagram of the appearance of the scan device LD, and FIG. 3 is a schematic diagram of the structure of the scan device LD. In FIG. 2, the scan device LD is in a shape of stereoscopic columnar, and emits the light 200 for scanning the horizontal direction. The light 200 of FIG. 2 is not necessarily parallel to each other (as shown in FIG. 3, the light 200 is in vertical direction, but does not need to be parallel to each other). In addition, in FIG. 3, the scan device LD includes the light scanning module LDM, which includes the point light source 300, the prism 302, the reflector 304, and the synchronization processing module 306. The prism 302 rotates according to a fixed speed. The synchronization processing module 306 is used for controlling the rotation angle of the reflector 304 according to the rotation speed of the prism 302, so that the light emitted from the point light source 300 to the prism 302 is reflected to a specific direction, to form the first scanning light source, as the light 200 of FIG. 2.

Figure 4:
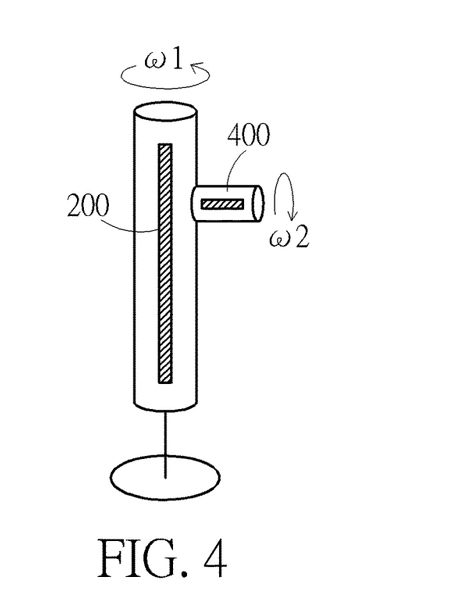
FIG. 4 is a schematic diagram of a scan device with multiple light scanning modules according to an embodiment of the present disclosure.

FIG. 4 is a schematic diagram of the scan device LD with multiple light scanning modules according to an embodiment of the present disclosure. The scan device LD further includes another light scanning module that are vertically disposed on the scan device LD for generating the second scanning light source. For example, the second scanning light source emits the light 400 in horizontal for scanning the vertical direction. The components and operation principles of the light scanning module can be referred to above, so it is omitted herein. Note that, the light scanning modules of the scan device LD rotates according to the angular velocity $\omega 1$ and $\omega 2$, respectively, and transmits the data of the angular velocities $\omega 1$ and $\omega 2$ to the computing device 100 through the synchronization processing module 306. In addition, in order to make the HMD to distinguish the first and the second scanning light sources, the first scanning light source and the second scanning light source are configured of different wavelengths, and thus the HMD is able to recognize the first scanning light source and the second scanning light source with the corresponding wavelengths. Alternatively, the point light source of the first scanning light source and the second scanning light source respectively generates a light by pulse width modulation (PWM), and thus the HMD distinguishes duty cycle or the equivalent signal frequency of the light.

Figure 5:
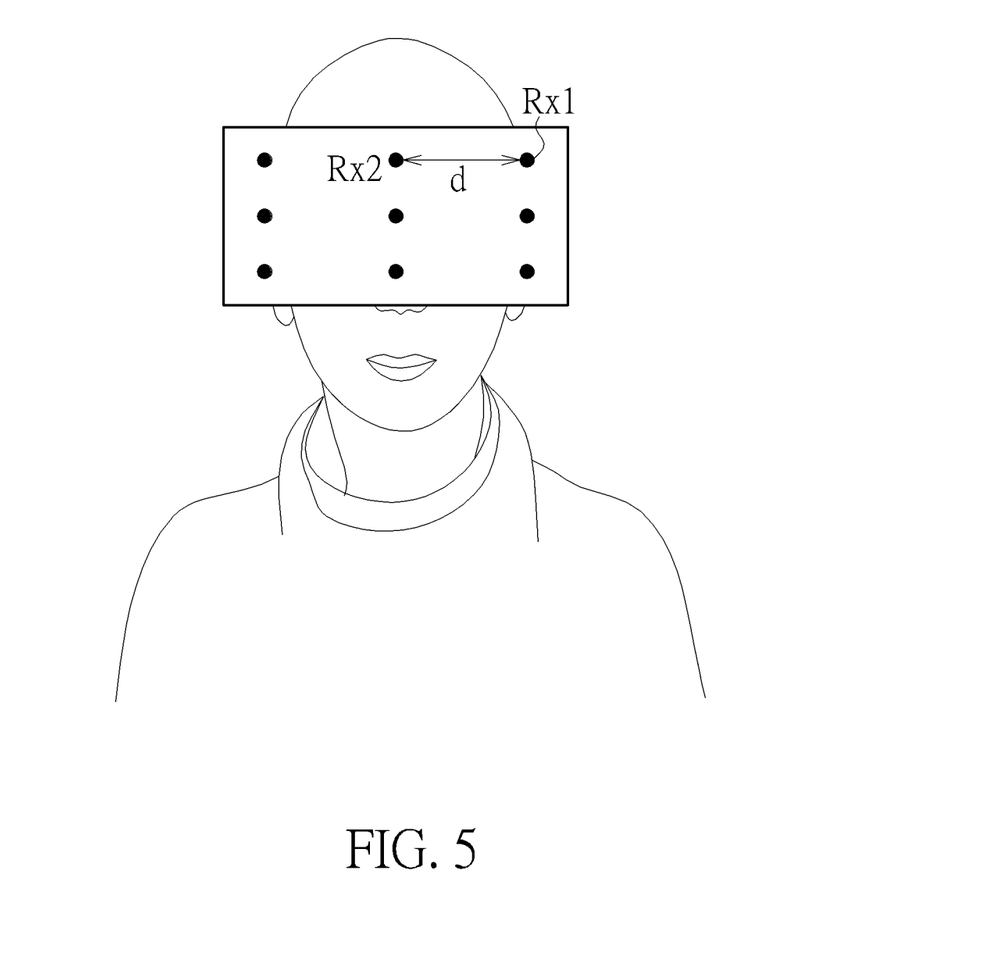
FIGS. 5-6 are schematic diagrams of a head mounted displayer according to an embodiment of the present disclosure.
Figure 6:
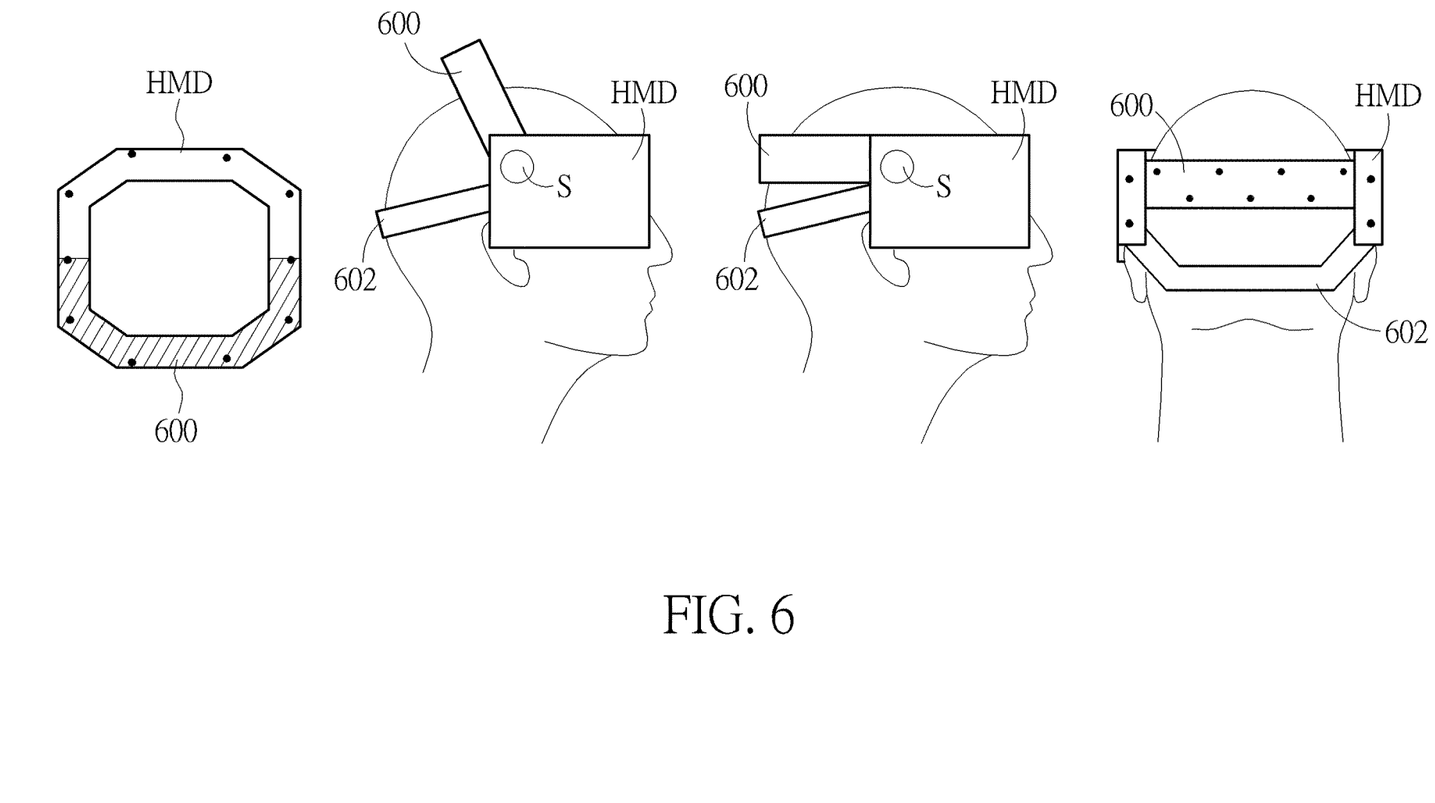

Refer to FIG. 5 for the detailed description of the HMD. The HMD includes a plurality of receivers (taking the receivers Rx1 and Rx2 as an example), wherein the set distance between the receivers is represented as "d" in FIG. 5. As shown in FIG. 6, if the user does not face the scan device LD, the receivers of the HMD may not be able to receive the signal due to being obscured by the human body. Therefore, the present disclosure increases a light source receiving module to the HMD. In a word, the light source receiving module (i.e. receiver array) is deployed at the rear and the side of the HMD, and connected to the HMD through a connector. In order to make the set distance d between the receivers in a fixed value, the rear and side receiver array of the HMD need to be disposed on the base 600 to avoid deformation. In an embodiment, the base 600, in which the receiver array is disposed, is coupled to the HMD through the rotating shaft S for the user to adjust the angle for convenient wear. In addition, the fixed strap 602 provided on the HMD can be adapted to the head shape of different users.

Figure 7:
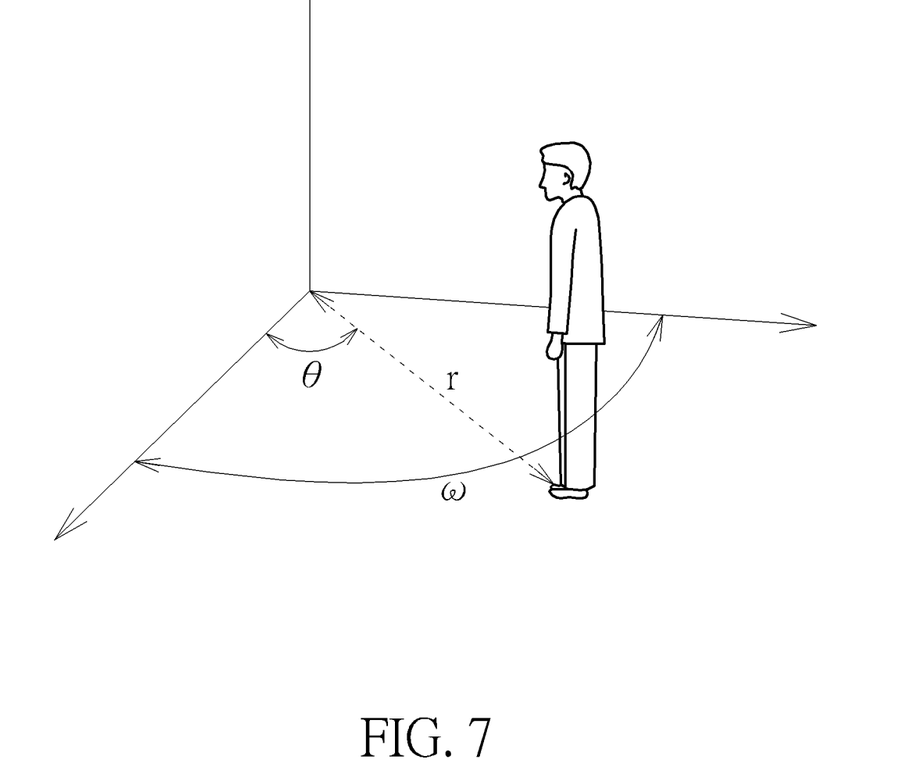
FIG. 7 is a schematic diagram of a user positioning according to an embodiment of the present disclosure.

Reference is made to FIG. 7 for tracking and positioning operation of the computing device 100. FIG. 7 is a schematic diagram of a user positioning according to an embodiment of the present disclosure. In FIG. 7, the angular velocity $\omega$ is the speed at which the scan device LD rotates (i.e. the angular velocities $\omega 1$ and $\omega 2$ of the light scanning module as abovementioned), and the time difference that the scanning light source received by the receiver Rx1 and the receiver Rx2 is represented as Δt. Assume that the distance from the scan device LD to the receiver Rx1 is set to "r", the scan speed from the receiver Rx1 to the receiver Rx2 is V=ω·r=d/Δt. That is, if the angular velocity ω is constant, the set distance d between the receiver Rx1 and the receiver Rx2 is also a fixed value. In other words, the scan speed V is proportional to the distance r, which can be interpreted as that the angular velocity of the scan device LD is constant. The farther the receiver Rx1 is from the scan device LD, the shorter the scanning light source scans from the receiver Rx1 to the receiver Rx2. Therefore, the distance r between the receiver Rx1 and the scan device LD can be derived as the following formula:

$$r = \frac{d}{\Delta t \cdot \omega} = \frac{v}{\omega}$$

Note that, theoretically, a set of receivers can increase the accuracy of positioning. If a number of "n" receivers are set in the HMD, a number of "n-1" distances r can be obtained, wherein the average or a certain value of the distance r is determined according to the algorithm, for position calculation.

Figure 8A:
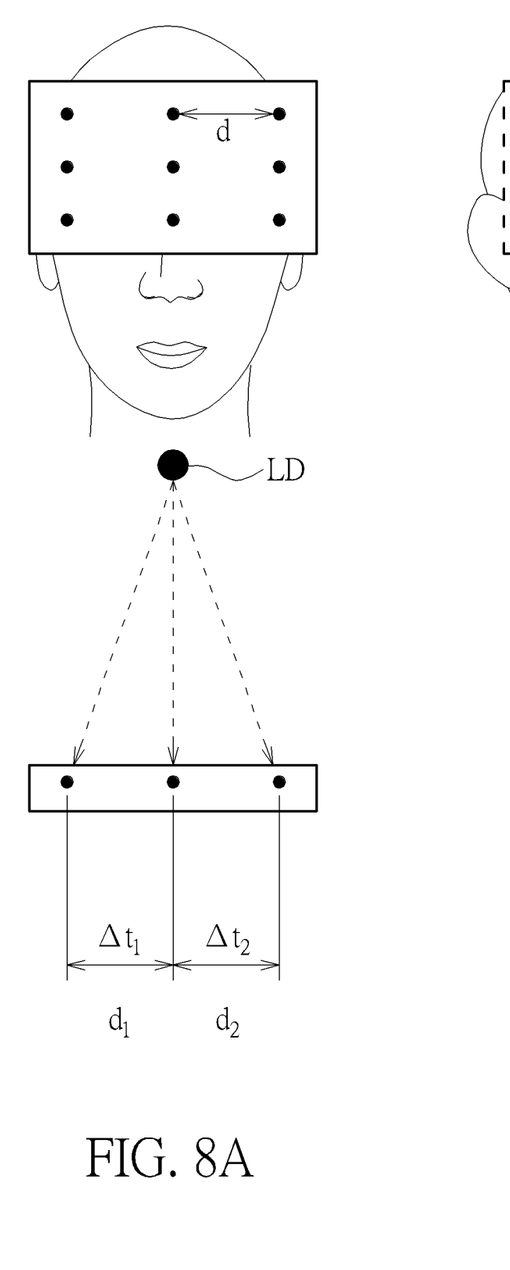
FIGS. 8A-8B are schematic diagrams of a head mounted displayer with different angles according to an embodiment of the present disclosure.

In FIG. 8A, the abovementioned tracking and positioning operation is applied in that the HMD faces the scan device LD. For position calculation, it is assumed that the scan device LD takes 1 second for one turn, namely T=1 s, the angular velocity ω=6.2832 rad/s, the set distance d between the receivers Rx is 2 cm. The computing device 100 obtains the time difference Δt=0.02 s by which the scanning light source of the scan device LD scans from the receiver Rx1 to the receiver Rx2. In this case, the computing device 100 can calculate the speed $$V = \frac{0.02}{0.02} = 1 \text{ m/s}$$

by which the scanning light source scans from the receiver Rx1 to the receiver Rx2, and the distance $$r = \frac{v}{\omega} = \frac{1}{6.2632} = 0.1592 \text{ m}$$

Figure 8B:
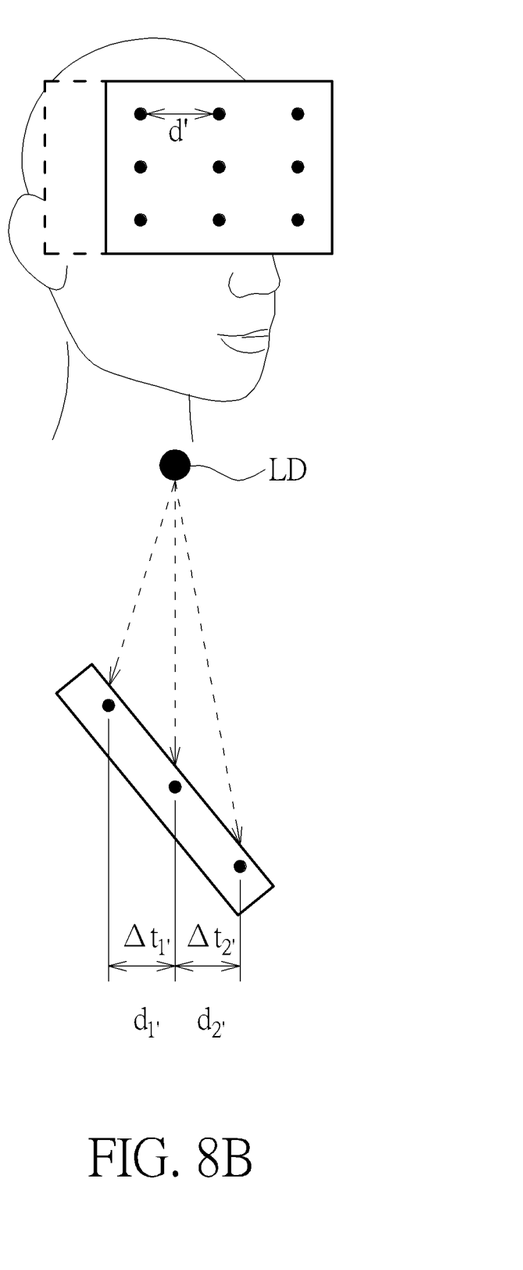

However, in a practical application, the HMD may not directly face the scan device LD, but in a lateral or other angle. With the above position calculation, a positioning error may occur. Thus, the present disclosure further proposes a debug mechanism for enhancing the above tracking and positioning operation. Reference is made to FIG. 8B, which is a schematic diagram of the HMD at different angles according to an embodiment. As can be seen, the computing device 100 calculates the distance r through the time difference according to the set distance d. The set distance d (as set distances $d_1$ and $d_2$ shown in FIG. 8A) should be fixed in the HMD. However, the user may not always face the scan device LD at all times. In this case, the set distance d' obtained by the computing device 100 may be variable due to the offset angle of the user. In other words, the set distance d' is deviated from the actual set distance d, so that the time difference Δt is also affected, which in turn affects the calculation of the distance r.

In an embodiment, the time differences Δt1 and Δt2 measured by each receiver are the same when the user faces the scan device LD, so the computing device 100 obtains the same set distance d. However, as shown in FIG. 6, since the receivers on the HMD are in a circularity setting, the receiver facing the scan device LD measure the maximum time difference Δt, whereas other receivers measures smaller time differences Δt1' and Δt2' due to the shortening of the lateral distance (i.e. the time at which the scan device LD sweeps from the receiver Rx1 to the receiver Rx2 becomes shorter). In this case, if there is no other auxiliary condition, the computing device 100 may locate the user at a farther position. In order to avoid calculation errors due to offset angles, the computing device 100 discarded any time differences Δt, such as the time differences Δt1' and Δt2', but the maximum time difference Δt max for position calculation. It is found that the set distance d' between the receivers is close to the actual design set distance d, so that the deviation between the set distance d' and the actual set distance d at different angles can be excluded.

Figure 9:
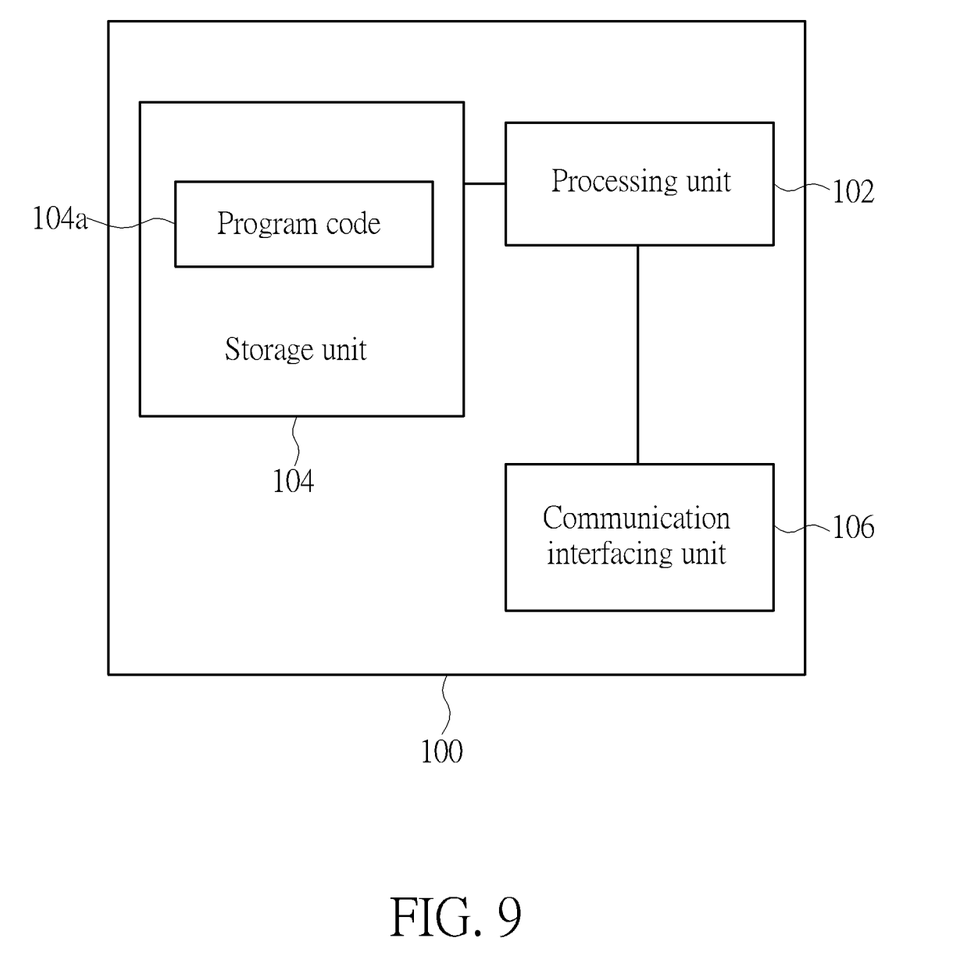
FIG. 9 is a schematic diagram of a computing device according to an embodiment of the present disclosure.

FIG. 9 is a schematic diagram of the computing device 100 according to one embodiment of the present disclosure. The computing device 100 may be a computing device, a notebook or a backpack PC, and includes a processing unit 102, such as a microprocessor or Application Specific Integrated Circuit (ASIC), a storage unit 104 and a communication interfacing unit 106. The storage unit 104 may be any data storage device that can store a program code 104a, for access by the processing unit 102. Examples of the storage unit 104 include but are not limited to a subscriber identity module (SIM), read-only memory (ROM), flash memory, random-access memory (RAM), CD-ROMs, magnetic tape, hard disk, and optical data storage device. The communication interfacing unit 106 could be a wireless transceiver for exchange signals with the HMD and the scan device LD according to processing results of the processing unit 102.

Figure 10:
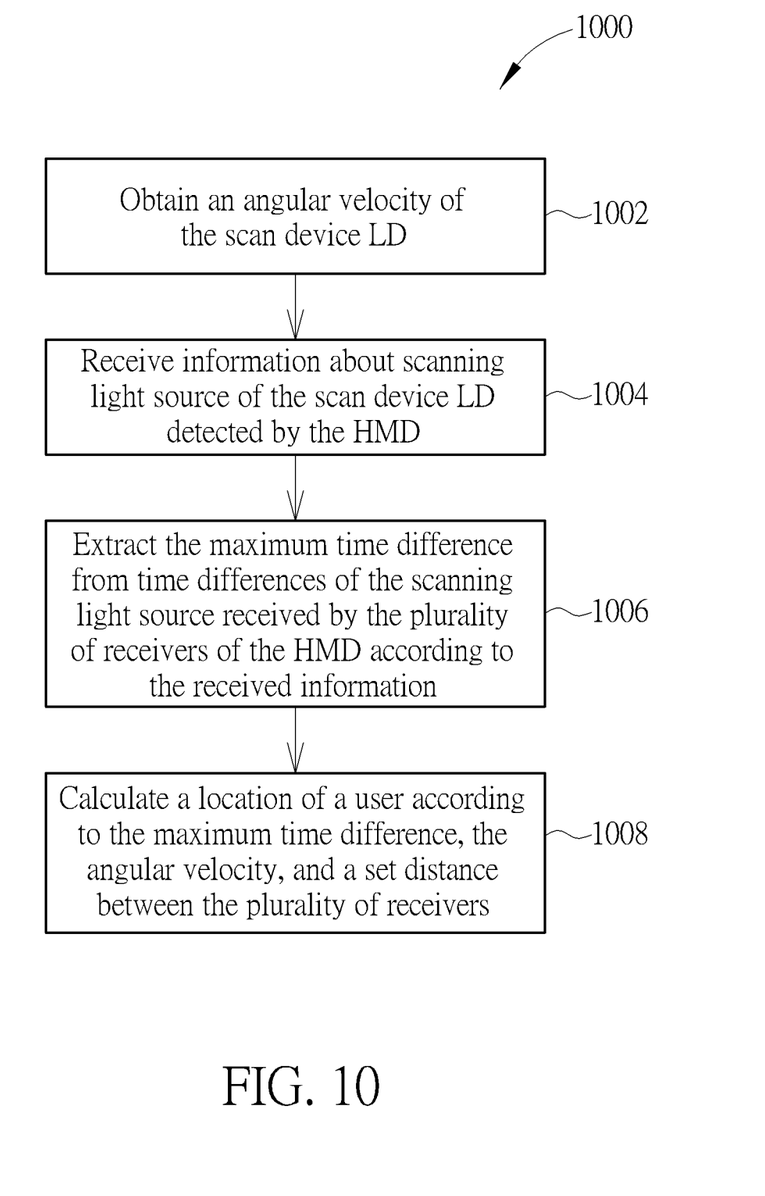
FIG. 10 is a flowchart of a tracking and positioning according to an embodiment of the present disclosure.

Reference is made to FIG. 10. A flowchart of the tracking and positioning process 1000 is illustrated. The tracking and positioning process 1000 could be utilized in the computing device 100, may be compiled into a program code 104a to be stored in the storage unit 104, and may include the following steps:

Step 1002: Obtain an angular velocity of the scan device LD.

Step 1004: Receive information about scanning light source of the scan device LD detected by the HMD.

Step 1006: Extract the maximum time difference from time differences of the scanning light source received by the plurality of receivers of the HMD according to the received information.

Step 1008: Calculate a location of a user according to the maximum time difference, the angular velocity, and a set distance between the plurality of receivers.

According to the tracking and positioning process 1000, the computing device 100 obtains the angular velocity of the scan device LD through the synchronization processing module 306 of the scan device LD, and obtains information for calculating the location of the user with the scanning light source received by each receiver of the HMD. For example, the information includes the time at which each receiver receives the scanning light source, so as to extract the time differences among the receivers receiving the scanning light sources. Therefore, the computing device 100 calculates the location of the user according to the abovementioned operation. In an embodiment, the computing device 100 can calculate the location of the user based on the maximum time difference. For the detailed calculation formulas of the tracking and positioning process 1000, refer to the above, and details are omitted herein.

Figure 11:
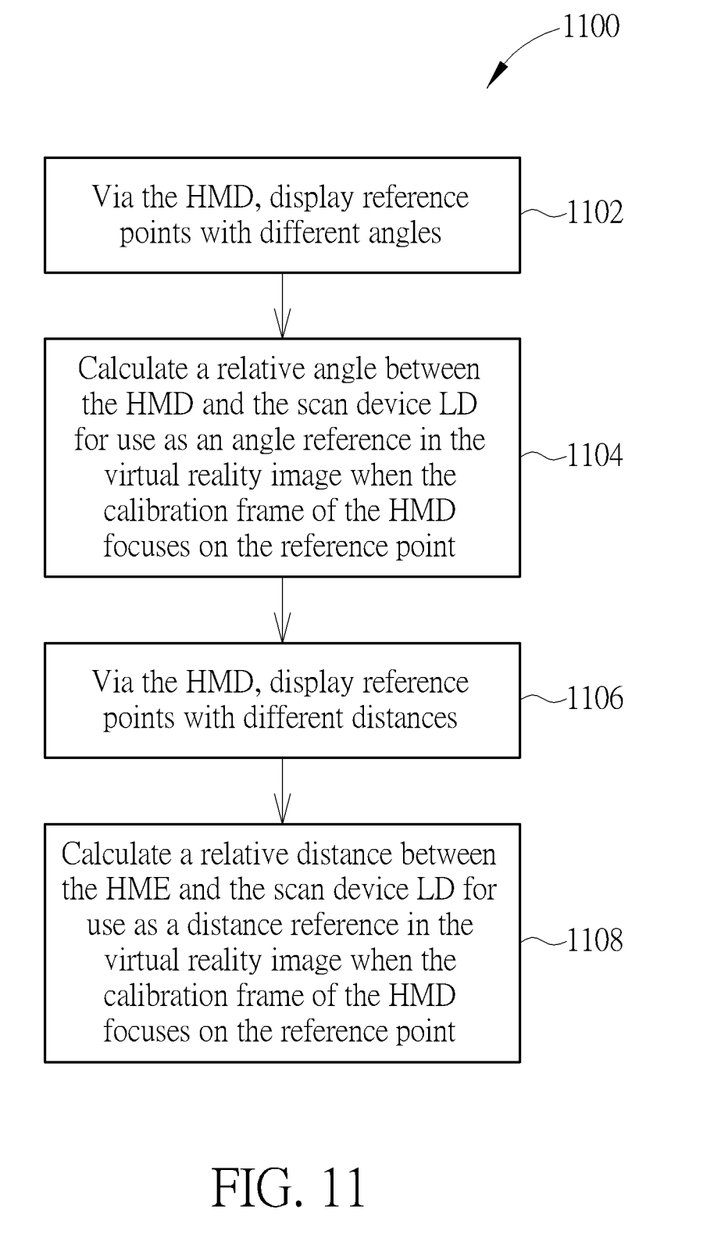
FIG. 11 is a flowchart of a calibration according to an embodiment of the present disclosure.

Reference is made to FIG. 11. A flowchart of the image displaying calibration process 1100 is illustrated. The image displaying calibration process 1100 could be utilized in the computing device 100, may be compiled into a program code 104*a* to be stored in the storage unit 104, and may include the following steps:

Step 1102: Via the HMD, display reference points with different angles.

Step 1104: Calculate a relative angle between the HMD and the scan device LD for use as an angle reference in the virtual reality image when the calibration frame of the HMD focuses on the reference point.

Step 1106: Via the HMD, display reference points with different distances.

Step 1108: Calculate a relative distance between the HME and the scan device LD for use as a distance reference in the virtual reality image when the calibration frame of the HMD focuses on the reference point.

Figure 12:
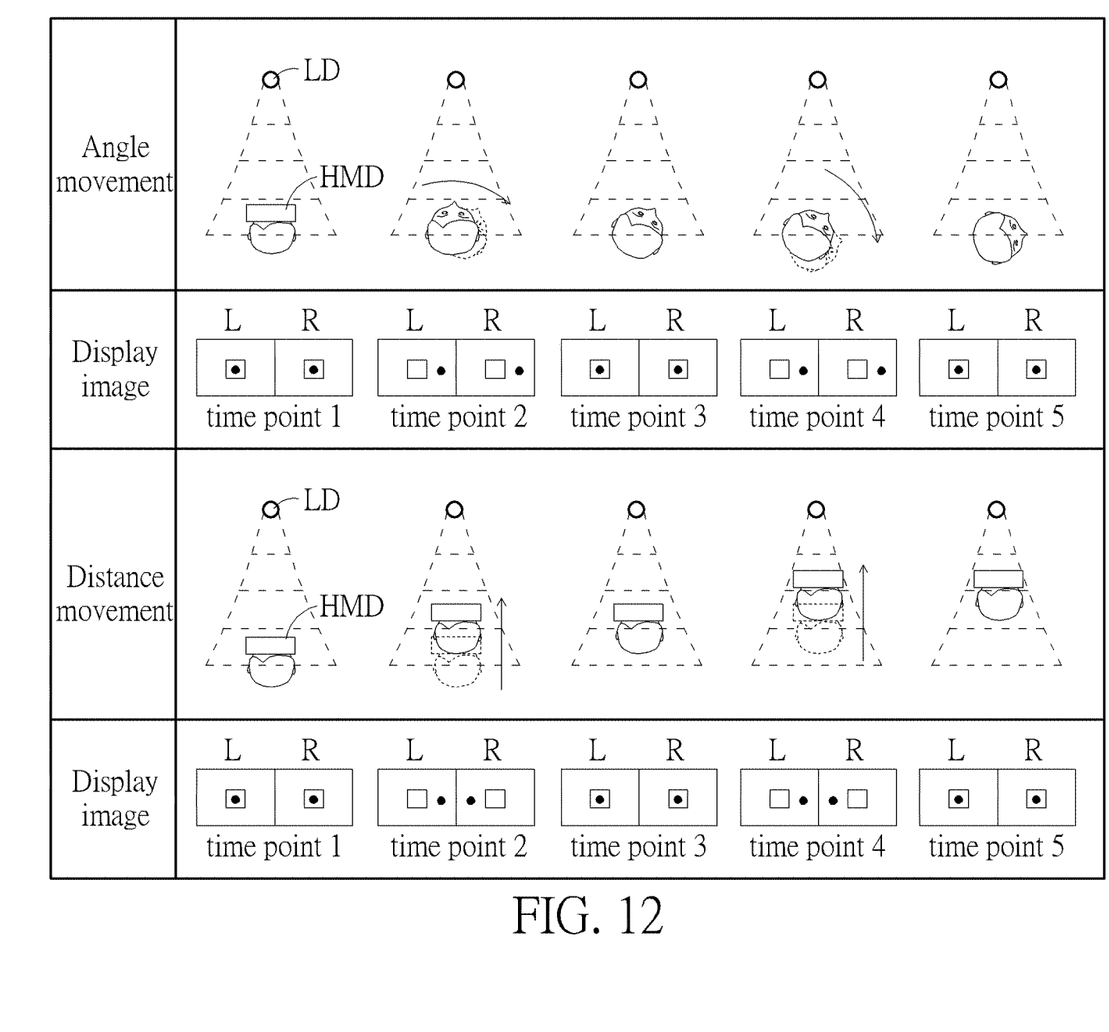
FIG. 12 is a schematic diagram of an image displaying calibration according to an embodiment of the present disclosure.

According to the image displaying calibration process 1100, the computing device 100 can connect the relative angle and relative distance to the angle and distance that the user actually moves in reality, and thus the user may feel real even in the virtual reality when the computing device 100 outputs the image to the HMD. For detailed calibration operation, please refer to FIG. 12, which is a schematic diagram of an image displaying calibration according to an embodiment of the present disclosure. At the beginning of the virtual reality, the computing device 100 outputs the image data to the HMD, wherein the image data includes reference points indifferent angles and distances. The HMD displays the reference points of different angles and distances through the left and right eye screens. In one embodiment, the user tracks the reference point through the fixed calibration frame of the left and right eye screens of the HMD (as shown in FIG. 12, the box in the "display screen" field represents the calibration frame, and the solid dot represents the reference point. Meanwhile, the information received by the receiver can be fed back to the computing device 100 as a calibration reference. In FIG. 12, the user rotates his/her head at a fixed point from the time point 1 to time point 5, so as to correspond the rotation angle in the virtual reality image to the actual rotation angle. For example, the computing device 100 transmits the image data to the HMD, wherein the image data includes a reference point of a specific angle. The HMD displays the reference point at upper 45 degrees at the left and right eye screens of the HMD after the HMD receives the image data. Therefore, the user turns the head to move the calibration frame to focus the reference point at the center of the calibration frame. At this time, the relative angle between the HMD and the scan device LD can be defined as a 45 degree in the virtual reality. Briefly, the computing device 100 connects the relative angles of the HMD and the scan device LD with the angle of rotation displayed in the in the virtual reality image. Similarly, in order to correspond the forward and backward moving distances identified in the virtual reality image to the actual moving distance in reality, the computing device 100 defines multiple sets of reference points with different relative distances. For example, assume that at the initial time point time 1, the user distance from the scan device LD at 3 meters. The system gives another reference point with different distance at the time point 2, and thus the user moves forward to move the calibration frame on the reference point, whereby this distance is defined as 2 meters. Similarly, at different time points 3-5, the computing device 100 can display different distances through the HMD, thereby connecting the relative distance between the HMD and the scan device LD with the moving distance displayed in the virtual reality image.

Figure 13:
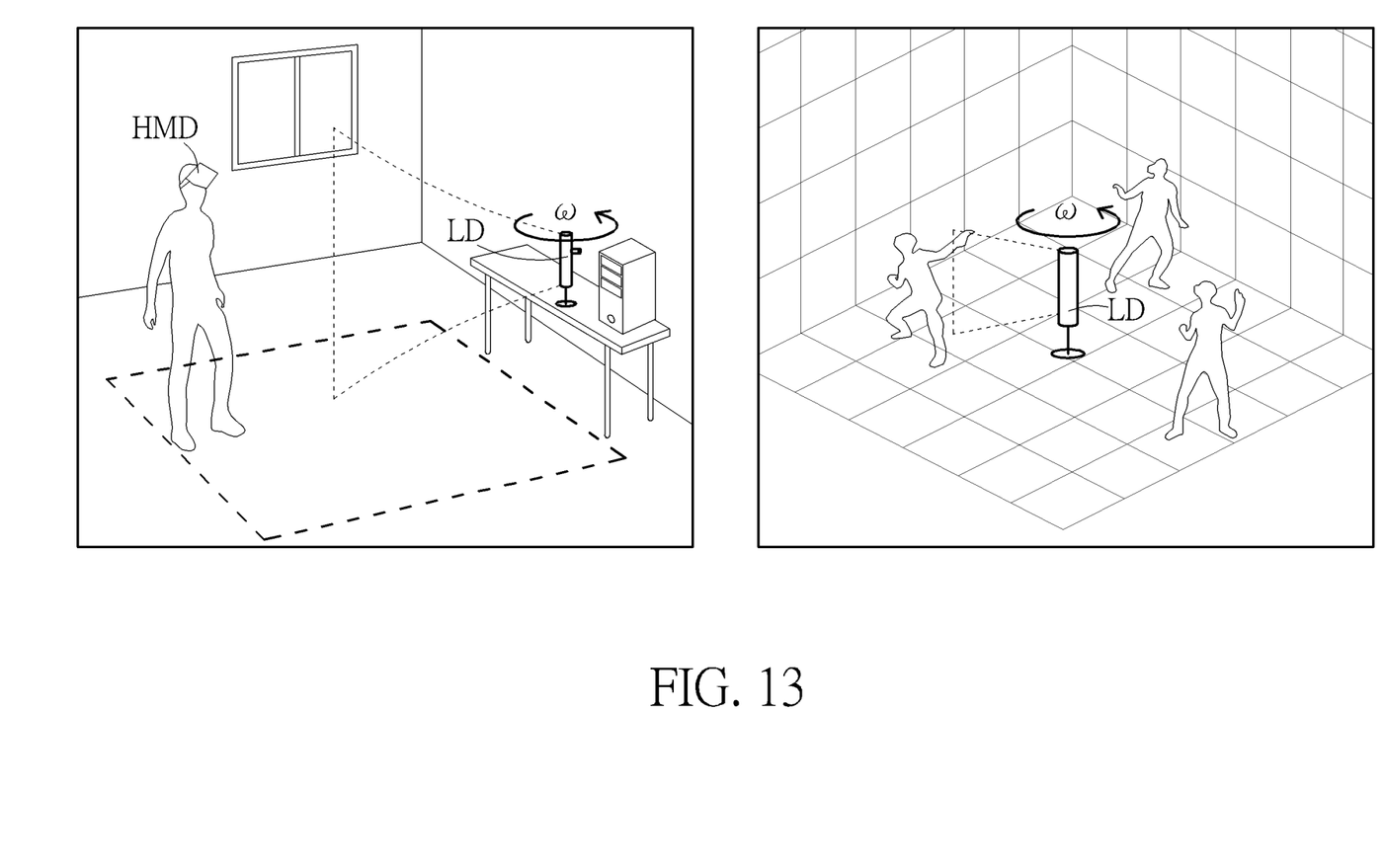
FIG. 13 is a schematic diagram of a configuration of a tracking system according to an embodiment of the present disclosure.

FIG. 13 is a schematic diagram of a configuration of a tracking system according to an embodiment of the present disclosure. The tracking system of the present disclosure can be applied/installed to different spaces and scenes without limitation of the size of the space, and there is no problem of blind spot scan. For example, the scan device LD can be placed at the edge of the room or placed in the center of the environment. The former placement is suitable for use in small space, such as in a general family room, while the latter placement is suitable for use in a larger space, such as multiplayer games in the VR Experience Hall. Note that, the scan device LD of the present disclosure only needs a set of power source or a built-in rechargeable battery. Since effective viewing angle of the conventional lighthouse is only 120 degrees, two lighthouses need to be installed in one space, resulting in the need for multiple sets of power sources and the complexity of the installation. In addition, the angle and height of the installation of the lighthouse also need to be accurately calculated to avoid the problem of scanning blind spot, so it is difficult to promote to general household use.

In conclusion, the present disclosure provides the scan device capable of tracking and positioning in 360 degrees, to avoid blind scanning spot, and being easily installed and applied to scenes of different space. In addition, the present disclosure applies the change of the relative angle/distance between the HMD worn by the user and the scan device as a basis for calibrating the image display. In addition, the debug mechanism proposed by the present disclosure can improve the positioning error where the HMD does not directly face the scan device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A tracking system for positioning a user's location comprising:
    a scan device, comprising a first light scanning module, for generating a first scanning light source, where the first light scanning module rotates in clockwise, in counterclockwise, or with fixed angle swing with respect to the scan device, and the first scanning light source is a symmetrical light;
    a head mounted displayer, comprising a plurality of receivers, for detecting the first scanning light source, to generate information about the first scanning light source; and
    a computing device, for calculating the location of the user based on the information.

2. The tracking system of claim 1, wherein the first light scanning module comprises a point light source, a prism, a reflector and a synchronization processing module, the prism rotates with a rotation speed, the synchronization processing module is used for controlling the reflector to rotate with an angle according to the rotation speed, whereby the point light source emitted to the prism is reflected to a specific direction to form the first scanning light source.

3. The tracking system of claim 1, wherein the scan device further comprises a second light scanning module for generating a second scanning light source, and the second light scanning module is able to rotate in clockwise, in counterclockwise, or with fixed angle swing with respect to the first light scanning module, and the second scanning light source is a symmetrical light.

4. The tracking system of claim 3, wherein the first scanning light source is used for scanning a horizontal direction of a light, and the second scanning light source is used for scanning a vertical direction of a light.

5. The tracking system of claim 1, wherein the head mounted displayer comprises a light receiving module deployed at a side and rear of the head mounted displayer to detect the first scanning light source.

6. The tracking system of claim 1, wherein the first light scanning module rotates according to an angular velocity.

7. The tracking system of claim 6, wherein the information comprises a time of the first scanning light source detected by a plurality of receivers of the head mounted displayer, and the computing device is further used for calculating the location of the user according to time differences of the first scanning light source detected by a plurality of receivers, the angular velocity, and the set distance between the plurality of receivers.

8. The tracking system of claim 7, wherein the computing device is further used for calculating the location of the user according to the maximum time difference among the time differences of the first scanning light source detected by the plurality of receivers, the angular velocity, and a set distance between the plurality of receivers.

9. The tracking system of claim 1, wherein the computing device is further used for displaying a reference point of a first angle or a first distance through the head mounted displayer, and a calibration frame of a fixed position, calculating a relative angle or a relative distance between the head mounted displayer and the scan device when the head mounted displayer moves to move the calibration frame to the reference point of the first angle or the first distance, and connecting the relative angle or the relative distance with the first angle or the first distance for use as an angle reference or a distance reference for image displaying.

10. A scan device for a tracking system, comprising:
 a first light scanning module, for generating a first scanning light source, wherein the first light scanning module rotates in clockwise, in counterclockwise, or with fixed angle swing with respect to the scan device, and the first scanning light source is a symmetrical light.

11. The scan device of claim 10, wherein the first light scanning module comprises a point light source, a prism, a reflector and a synchronization processing module, the prism rotates with a rotation speed, the synchronization processing module is used for controlling the reflector to rotate with an angle according to the rotation speed, whereby the point light source emitted to the prism is reflected to a specific direction to form the first scanning light source.

12. The scan device of claim 10, wherein the scan device further comprises a second light scanning module for generating a second scanning light source, and the second light scanning module is able to rotate in clockwise, in counterclockwise, or with fixed angle swing with respect to the first light scanning module, and the second scanning light source is a symmetrical light.

13. The scan device of claim 12, wherein the first scanning light source is used for scanning a horizontal direction of a light, and the second scanning light source is used for scanning a vertical direction of a light.

14. The scan device of claim 10, wherein the first light scanning module rotates according to an angular velocity.

15. A head mounted displayer for a tracking system, comprising:
 a light receiving module, disposed at a side and a rear of the head mounted displayer, wherein the light receiving module comprises a plurality of receivers for detecting a scanning light source generated by a scan device of the tracking system; and
 a fixed strap, for providing a user of wearing the head mounted displayer.

16. The head mounted displayer of claim 13, wherein the light source receiving module is connected to the head mounted displayer through a connector symmetrically disposed on two sides of the head mounted displayer.

17. The head mounted displayer of claim 14, wherein the connector is a rotating shaft for connecting the light source receiving module to the head mounted displayer with an angle adjustable manner.

* * * * *